United States Patent
Galli et al.

(10) Patent No.: US 6,608,123 B2
(45) Date of Patent: Aug. 19, 2003

(54) FLAME-RETARDANT POLYAMIDE MOLDING COMPOSITIONS

(75) Inventors: Daniele Galli, Mariano Comense (IT); Franco Speroni, Ceriano Laghetto (IT)

(73) Assignee: Rhodia Engineering Plastics S.r.l., Ceriano Laghetto (IT)

( * ) Notice: Subject to any disclaimer, the term of this patent is extended or adjusted under 35 U.S.C. 154(b) by 74 days.

(21) Appl. No.: 09/935,670

(22) Filed: Aug. 24, 2001

(65) Prior Publication Data

US 2002/0045688 A1 Apr. 18, 2002

Related U.S. Application Data

(63) Continuation of application No. PCT/EP00/01436, filed on Feb. 22, 2000.

(30) Foreign Application Priority Data

Feb. 24, 1999 (FR) .............................................. 99/02525

(51) Int. Cl.$^7$ ................................................ C08K 5/34
(52) U.S. Cl. ...................................... 524/100; 524/406
(58) Field of Search ................................. 524/100, 406

(56) References Cited

U.S. PATENT DOCUMENTS

| 3,458,470 A | * | 7/1969 | Edgar .......................... 260/37 |
| 6,025,419 A | * | 2/2000 | Kasowski et al. .......... 524/100 |

FOREIGN PATENT DOCUMENTS

| EP | 0 156 196 A2 | 10/1985 |
| FR | 1468064 | 4/1967 |
| WO | WO 96/09344 A1 | 3/1996 |
| WO | WO 98/07778 A1 | 2/1998 |

* cited by examiner

*Primary Examiner*—Kriellion A. Sanders
(74) *Attorney, Agent, or Firm*—Burns, Doane, Swecker & Mathis, L.L.P.

(57) ABSTRACT

Flameproofed polyamide compositions well suited for the production of molded shaped articles, for example those useful in the electrical and electronics fields, such as components for circuit breakers, switches and connectors, comprise a polyamide matrix having an effective flameproofing amount of a flame-/fire-retardation system distributed therethrough, the flame-/fire-retardation system including both a melamine derivative and a molybdenum compound, but, advantageously, no halogen and/or phosphorus flameproofing species.

24 Claims, No Drawings

FLAME-RETARDANT POLYAMIDE MOLDING COMPOSITIONS

CROSS-REFERENCE TO PRIORITY/PCT APPLICATIONS

This application claims priority under 35 U.S.C. §119 of FR-99/02525, filed Feb. 24, 1999, and is a continuation of PCT/EP00/01436, filed Feb. 22, 2000 and designating the United States (published in the French language on Aug. 31, 2000 as WO 00/50505; the title and abstract were also published in English), both hereby expressly incorporated by reference.

BACKGROUND OF THE INVENTION

1. Technical Field of the Invention

The present invention relates to novel flame-retardant polyamide compositions and, more especially, to novel flame-retardant polyamide compositions well suited for the production/manufacture of molded shaped articles.

This invention more particularly relates to polyamide compositions fire-retarded by formulating therein a system devoid of halogen or phosphorus values.

2. Description of the Prior Art

Polyamide-resin-based compositions are well suited for the production of shaped articles via various forming processes denoted by the generic term "molding". These shaped articles are useful in a wide variety of technical fields. Among these, the production of components for electrical or electronic systems is a major application requiring special properties. Thus, these components must have high mechanical properties, but also properties of chemical resistance, electrical insulation and, above all, high fire resistance.

The fire or flame retardation of polyamide-resin-based compositions has long been known to this art. Thus, the principal fire retardants therefor are red phosphorus and halogen compounds such as dibromophenol, polybromodiphenyls, polybromodiphenoxides and brominated polystyrene(s). Over the last twenty years, a new class of fire retardants has been developed, namely, organic nitrogen compounds belonging to the triazine class, such as melamine or derivatives thereof, such as melamine cyanurate, and more recently phosphates, polyphosphates and melamine pyrophosphates.

The advantage presented by the latter class of fire retardants is that the compounds in question contain no halogens or free phosphorus. This is because fire or flame retardation employing halogens or red phosphorus can generate toxic gases or vapors during combustion of the polyamide composition. The amounts of melamine compounds required to obtain satisfactory fire retardation are very high, especially in the case of compositions containing reinforcing fillers in the form of fibers such as glass fibers, mineral fibers, or thermostable organic fibers. The cost of these compositions, due to the large amounts of melamine compound, renders them of little interest from a commercial standpoint. In addition, this high concentration of melamine compound presents certain drawbacks, especially during compounding of the composition, such as production of vapor of the melamine compounds or, during production of the molded shaped articles, such as obstruction of the venting ducts and deposits formed in the molds themselves.

The compositions comprising melamine compounds may have good fire-retardation properties; however, these compositions have poor electric-arc-tracking resistance. This presents a problem when using same for the production of articles in the electrical field.

SUMMARY OF THE INVENTION

A major object of the present invention is the provision of novel flame-retardant polyamide compositions comprising a fire-retardation system based on melamine compounds in relatively low amounts, which system has good arc-tracking resistance, for example better than 300 V, and otherwise avoids or conspicuously ameliorates the above disadvantages and drawbacks to date characterizing the state of this art.

Briefly, the present invention features flameproofed polyamide-based compositions containing a fire-retardation system, said fire- or flame-retardation system comprising at least one melamine derivative and at least one molybdenum compound.

DETAILED DESCRIPTION OF BEST MODE AND SPECIFIC/PREFERRED EMBODIMENTS OF THE INVENTION

More particularly according to the present invention, the weight concentration of the melamine derivative or compound advantageously ranges from 1% to 30% by weight with respect to the total weight of the polyamide-based composition and more advantageously from 10% to 20% by weight.

The weight concentration of the molybdenum compound is advantageously less than 15% by weight with respect to the total weight of the composition, preferably less than or equal to 10%.

In a preferred embodiment of the invention, the molybdenum compound is selected from the group consisting of molybdenum trioxide, ammonium octamolybdate, molybdenum disulfide.

In another preferred embodiment of the invention, the fire-retarded compositions contain an elastomer-type polymer which contributes to improving the impact strength. There is no limitation on the type of elastomer that can be incorporated. In particular, all of the known elastomers for increasing the impact strength of polyamides are useful. Exemplary suitable elastomers include ethylene/acrylic ester/maleic anhydride, ethylene/propylene/maleic anhydride, EPDMs (ethylene/propylene/diene monomer), optionally comprising a grafted maleic anhydride moiety. The weight concentration of elastomer is advantageously less than 20%, preferably less than 5%.

In another embodiment of the invention, the fire-retardant system comprises a compound containing at least one carboxylic acid functional group and having a low vapor pressure at the temperatures at which it is admixed with the polymeric matrix, especially during the process for manufacturing the compound, for example at temperatures of between approximately 200° C. and approximately 350° C. Exemplary of such suitable carboxylic acids are monocarboxylic acids, such as myristic acid, palmitic acid, stearic acid, behenic acid, benzoic acid, salicylic acid and, in general, monocarboxylic acids having a greater number of carbon atoms than 10, dicarboxylic acids, such as oxalic acid, malonic acid, succinic acid, glutaric acid, adipic acid, pimelic acid, decanedioic acid, dodecanedioic acid, isophthalic acid and terephthalic acid, or polycarboxylic acids, such as trimesic acid. This compound, by reduction in the chain lengths of the polyamide when the latter is melted by the flame, causes the formation of small drops, therefore having a high surface-area/mass ratio. Thus, the temperature of these drops will very rapidly decrease and they will no longer be able to ignite the elements with which they come into contact.

Advantageously, the mono-, di- or polycarboxylic acid is present in a weight concentration ranging from 0.01% to 3% with respect to the polyamide resin, preferably from 0.05% to 1%.

The polyamide is characteristically selected from the group consisting of the polyamides prepared via polycondensation of a linear dicarboxylic acid with a linear or cyclic diamine, such as PA-6,6, PA-6,10, PA-6,12, PA-12,12, PA-4,6 and MXD-6, or between an aromatic dicarboxylic acid and a linear or aromatic diamine, such as polyterephthalamides, polyisophthalamides and polyaramides, polyamides obtained by the polycondensation of an amino acid with itself, the amino acid possibly being generated by the hydrolytic opening of a lactam ring, such as, for example, PA-6, PA-7, PA-11 and PA-12. The compositions of the invention can also comprise copolyamides derived especially from the above polyamides, or blends of these polyamides or copolyamides.

The preferred polyamides of this invention are polyhexamethylene adipamide, polycaprolactam, or copolymers and blends of polyhexamethylene adipamide with polycaprolactam.

The melamine derivatives or compounds suitable for the invention are advantageously selected from the group consisting of melamine cyanurate, described in JP-A-53/51250, JP-A-54/118454 and polyphosphates, described in WO 96/09344. Preferably, the compound employed for flameproofing the compositions according to the invention is melamine polyphosphate. Its weight concentration is advantageously less than 25% with respect to the total weight of the composition, preferably less than 20%.

In yet another embodiment of the invention, the subject compositions contain reinforcing fillers selected from the group consisting of glass fibers, mineral fibers, for example wollastonite, ceramic fibers, thermosetting organic fibers, such as polyphthalamide fibers, and mineral fillers such as kaolin.

The weight concentration of reinforcing fillers advantageously ranges from 1% to 50% by weight with respect to the total weight of the composition, preferably from 15% to 50%.

The compositions of the invention may contain all the additives normally formulated into polyamide-based compositions suited for the manufacture of molded shaped articles. Thus, by way of examples of such additives, representative are heat stabilizers, UV stabilizers, antioxidants, lubricants, pigments, colorants, plasticizers and impact modifiers.

Exemplary antioxidants and heat stabilizers include the alkali metal halides, copper halides, sterically hindered phenolic compounds, and aromatic amines.

The UV stabilizers are typically benzotriazoles, benzophenones or HALS.

The compositions of the invention are conveniently formulated by mixing the various constituents, generally in a single-screw or twin-screw extruder, at a temperature high enough to maintain the polyamide resin in the molten state. In general, the polymer compound obtained is extruded in the form of rods which are cut into pieces in order to form granules.

Adding the flame- or fire-retardant system or the additives may be carried out by addition of these compounds into the polyamide melt in pure form, or in the form of a masterbatch in a resin such as, for example, a polyamide resin.

The granules obtained are suited as raw material supplied in processes for manufacturing molded shaped articles, such as via injection molding, extrusion, extrusion-blow molding processes.

Thus, the compositions of the invention are particularly suitable for the manufacture of articles useful in the field of electrical or electronic connection technology, such as components for circuit breakers, switches, connectors or the like.

The properties of the compositions of the invention are determined on test pieces, employing the following techniques:

Flame resistance: UL-94 test according to the Underwriters Laboratories procedure. This test is carried out on test pieces having a thickness of 3.2 mm, 1.6 mm and 0.8 mm. The results are expressed as the following ratings:

UC: unclassified (little fire retardation)

V-2: the mean combustion time is less than 25 seconds (self-extinguishability), polyamide drops igniting the cotton;

V-1: mean combustion time less than 25 seconds (self-extinguishability), no ignition of the cotton by the drops;

V-0: mean combustion time less than 5 seconds (self-extinguishability), no ignition of the cotton.

Incandescent-wire resistance: measured according to the IEC 695-2-1 standard on test pieces having a thickness of 3.0 mm, 1.6 mm and 1 mm.

The mechanical properties were determined employing the following methods:

(a) tensile strength according to the ISO R 527 standard after conditioning the test piece at 23° C. and a relative humidity of 50%;

(b) elongation at break according to the ISO 527 standard;

(c) modulus according to the ISO 527 standard;

(d) IZOD impact strength according to the ISO 179/IeU standard;

(e) CHARPY impact strength according to the ISO 179/IeA standard;

(f) electric-arc propagation resistance according to the IEC 112 standard.

In order to further illustrate the present invention and the advantages thereof, the following specific examples are given, it being understood that same are intended only as illustrative and in nowise limitative.

EXAMPLES 1–6

Various compositions were formulated by compounding a polyamide with a melamine polyphosphate, molybdenum trioxide and glass fibers.

The compound was produced in a single-screw extruder at a temperature of 250° C. The compound was extruded in the form of rods in order to form granules by cutting these rods.

The materials employed were:

Polyamide A: polyhexamethylene adipamide (PA-6,6) marketed under the trademark "Tecnonylon27 A 00"

Melamine compound B: melamine polyphosphate marketed under the trademark "MELAPUR 200"

Molybdenum trioxide C: molybdenum trioxide MFR marketed by Clymax Molybdenum USA Glass fibers D: glass fibers 10 pm in diameter, in the form of chopped strands marketed under the trademark "FV-R123"

Elastomer E: LOTADER 3210 marketed by Elf Atochem
Elastomer F: EXXELOR VA 1801 marketed by Exxon Chemicals.

The percentage concentration by weight of each component and the mechanical and fire-retardation properties of each composition are reported in the Table below:

TABLE

| Example | 1 | 2 | 3 | 4 | 5 | 6 |
|---|---|---|---|---|---|---|
| A | 50 | 55 | 50 | 43 | 43 | 45 |
| B | 25 | 20 | 20 | 25 | 25 | 20 |
| C | 0 | 0 | 5 | 5 | 5 | 10 |
| D | 25 | 25 | 25 | 25 | 25 | 25 |
| E | 0 | 0 | 0 | 2 | 0 | 0 |
| F | 0 | 0 | 0 | 0 | 2 | 0 |
| Notched Charpy impact strength, kJ/m$^2$ | 4.1 | 4.6 | 5.3 | 5.3 | 5.1 | 5.6 |
| Unnotched Charpy impact strength, kJ/m$^2$ | 32.9 | 40 | 42 | 40 | 41 | 13.7 |
| Tensile strength | 133.5 | 140 | 156 | 149 | 154 | 102.7 |
| Elongation at break, % | 1.9 | 2.3 | 1.7 | 1.6 | 1.7 | 0.9 |
| Modulus, MPa | 11258 | 10735 | 11930 | 11700 | 12150 | 13543 |
| UL-94 test 3.2/1.6/0.8 mm | V0/V0/V1 | V0/V1/UC* | V0/V0/V0 | V0/V0/V1 | V0/V0/V1 | V0/V0/V1 |
| Incandescent-filament test at 3/1.6/1 mm | 960/960/960 | 960/960/960 | 960/960/960 | 960/960/960 | 960/960/960 | 960/960/960 |
| Arc-propagation resistance test | <300 V | not measured | >400 V | >400 V | >350 V | >400 V |

*UC: Unclassifiable

These tests evidence that the presence of molybdenum trioxide makes it possible to reduce the amount of melamine while still maintaining satisfactory fire-retardation properties and to obtain compositions having a good arc-tracking resistance.

While the invention has been described in terms of various specific and preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A flameproofed polyamide molding composition comprising a polyamide matrix having an effective flameproofing amount of a flame-/fire-retardation system distributed therethrough, said flame-/fire-retardation system including both at least one melamine derivative and at least one molybdenum compound.

2. A flameproofed polyamide molding composition consisting essentially of a polyamide matrix having an effective flameproofing amount of a flame-/fire-retardation system distributed therethrough, said flame-/fire-retardation system including both at least one melamine derivative and at least one molybdenum compound.

3. A flameproofed polyamide molding composition comprising a polyamide matrix having an effective flameproofing amount of a flame-/fire-retardation system distributed therethrough, said flame-/fire-retardation system being devoid of halogen and phosphorus flameproofing values, but including both at least one melamine derivative and at least one molybdenum compound.

4. The flameproofed polyamide molding composition as defined by claim 1, comprising from 1% to 30% by weight of said at least one melamine derivative.

5. The flameproofed polyamide molding composition as defined by claim 4, comprising less than 15% by weight of said at least one molybdenum compound.

6. The flameproofed polyamide molding composition as defined by claim 5, comprising less than 10% by weight of said at least one molybdenum compound.

7. The flameproofed polyamide molding composition as defined by claim 1, said at least one molybdenum compound being selected from the group consisting of molybdenum trioxide, ammonium octamolybdate and molybdenum disulfide.

8. The flameproofed polyamide molding composition as defined by claim 1, said at least one melamine derivative being selected from the group consisting of melamine cyanurate, melamine phosphate and a melamine pyrophosphate.

9. The flameproofed polyamide molding composition as defined by claim 8, said at least one melamine derivative comprising a melamine polyphosphate.

10. The flameproofed polyamide molding composition as defined by claim 9, comprising less than 25% by weight of said melamine polyphosphate.

11. The flameproofed polyamide molding composition as defined by claim 1, comprising an effective reinforcing amount of a fibrous filler material.

12. The flameproofed polyamide molding composition as defined by claim 11, said fibrous material being selected from the group consisting of glass fibers, mineral fibers and heat-resistant organic fibers.

13. The flameproofed polyamide molding composition as defined by claim 1, further comprising an effective impact strength-improving amount of at least one elastomeric polymer.

14. The flameproofed polyamide molding composition as defined by claim 13, comprising less than 5% by weight of said at least one elastomeric polymer.

15. The flameproofed polyamide molding composition as defined by claim 1, said flame-/fire-retardant system further comprising at least one low vapor pressure carboxylic acid.

16. The flameproofed polyamide molding composition as defined by claim 15, comprising from 0.01% to 3% by weight of said at least one low vapor pressure carboxylic acid.

17. The flameproofed polyamide molding composition as defined by claim 15, said at least one low vapor pressure carboxylic acid being selected from the group consisting of myristic acid, palmitic acid, stearic acid, behenic acid, benzoic acid, salicylic acid, oxalic acid, malonic acid, succinic acid, glutaric acid, adipic acid, pimelic acid, decanedioic acid, dodecanedioic acid, isophthalic acid, terephthalic acid and trimesic acid.

18. The flameproofed polyamide molding composition as defined by claim 1, said polyamide matrix comprising PA-6,6, PA-6,10, PA-6,12, PA-12,12, PA-4,6, MXD-6, a polyterephthalamide, a polyisophthalamide, a polyaramide, PA-6, PA-7, PA-11, PA-12, or copolyamide or blend thereof.

19. The flameproofed polyamide molding composition as defined by claim 18, said polyamide matrix being selected from the group consisting of polyhexamethylene adipamide, polycaprolactam, or a copolymer or blend of polyhexamethylene adipamide with polycaprolactam.

20. The flameproofed polyamide molding composition as defined by claim 1, further comprising a heat stabilizer, UV stabilizer, antioxidant, lubricant, pigment, colorant, plasticizer and/or impact modifier.

21. A fireproof molded article shaped from a flameproofed polyamide molding composition comprising a polyamide matrix having an effective flameproofing amount of a flame-/fire-retardation system distributed therethrough, said flame-/fire-retardation system including both at least one melamine derivative and at least one molybdenum compound.

22. A fireproof molded article shaped from a flameproofed polyamide molding composition comprising a polyamide matrix having an effective flameproofing amount of a flame-/fire-retardation system distributed therethrough, said flame-/fire-retardation being devoid of halogen and phosphorus flameproofing values, but including both at least one melamine derivative and at least one molybdenum compound.

23. The molded shaped article as defined by claim 21, having an arc-tracking resistance of greater than 300V.

24. The molded shaped article as defined by claim 21, comprising a circuit breaker component, electrical/electronic switch, or electrical/electronic connector.

* * * * *